United States Patent
Ota et al.

(10) Patent No.: US 8,639,422 B2
(45) Date of Patent: Jan. 28, 2014

(54) COOLING SYSTEM FOR HYBRID WORKING MACHINE

(75) Inventors: Yasunori Ota, Tsuchiura (JP); Satoshi Iwasaki, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/818,298

(22) PCT Filed: Dec. 27, 2011

(86) PCT No.: PCT/JP2011/080338
§ 371 (c)(1),
(2), (4) Date: Feb. 21, 2013

(87) PCT Pub. No.: WO2012/091067
PCT Pub. Date: Jul. 5, 2012

(65) Prior Publication Data
US 2013/0275011 A1   Oct. 17, 2013

(30) Foreign Application Priority Data
Dec. 28, 2010   (JP) ................. 2010-292844

(51) Int. Cl.
*B60K 11/04* (2006.01)
(52) U.S. Cl.
USPC ............................................. 701/50; 701/22

(58) Field of Classification Search
USPC ........... 701/22, 50; 180/65.21, 65.265, 65.29, 180/68.4, 68.2, 68.5
See application file for complete search history.

(56) References Cited

U.S. PATENT DOCUMENTS

| 5,251,588 | A | 10/1993 | Tsujii et al. |
| 6,899,162 | B2 * | 5/2005 | Hohl et al. ............ 165/41 |
| 7,628,125 | B2 * | 12/2009 | Kaita et al. ............ 123/41.31 |

FOREIGN PATENT DOCUMENTS

| JP | 05-131848 A | 5/1993 |
| JP | 06-199139 A | 7/1994 |
| JP | 11-022466 A | 1/1999 |
| JP | 3497873 B2 | 11/2003 |
| JP | 2008-169613 A | 7/2008 |

* cited by examiner

*Primary Examiner* — Richard Camby
(74) *Attorney, Agent, or Firm* — Mattingly & Malur, PC

(57) ABSTRACT

When temperature is low, a low-temperature mode is selected, followed by the activation of the heating mode functionality 25a of a PCU 25. Specifically, the PCU 25 sets the ratio of energy recovered by a capacitor 23 to be equal to or greater than the largest value of the energy recovery ratios of the capacitor 23 in a normal mode (e.g., assist motor 22:capacitor 23=2:8). Thus, more energy is stored on the capacitor 23 than in the normal mode, helping the capacitor 23 generates heat. As a result, the liquid temperature of the coolant is increased, and its viscosity is reduced accordingly. As above, the invention provides a simple cooling system to be mounted on a hybrid working machine, which is capable of preventing decreases in energy efficiency at low temperature.

7 Claims, 8 Drawing Sheets

COOLING SYSTEM FOR HYBRID WORKING MACHINE

TECHNICAL FIELD

The present invention relates to a cooling system used to cool electric components mounted on a hybrid working machine.

BACKGROUND ART

A hydraulic excavator, an example of hydraulic working machine, typically includes a track structure; a swing structure mounted atop the track structure in a swingable manner; and a multi-joint working device (front device), which is connected to the swing structure in a vertically movable manner and composed of a boom, an arm, and a bucket. The track structure, swing structure, and front device constitute a driven component of a drive system mounted on the excavator.

Such a drive system is often of the hydraulic type and commonly includes a prime mover (engine); at least one hydraulic pump driven by the prime mover; and multiple hydraulic actuators driven by the hydraulic fluid discharged from the hydraulic pump. Examples of hydraulic actuators include a hydraulic boom cylinder, a hydraulic arm cylinder, and a hydraulic bucket cylinder, used to actuate a boom, an arm, and a bucket, respectively. Further examples include a hydraulic travel motor for moving a track structure and a hydraulic swing motor for rotating a swing structure relative to the track structure.

In the field of automobiles, on the other hand, the use of hybrid drive systems has been proposed. In a hybrid drive system, an engine drives a generator, and the resultant electric power is partially used to drive an electric motor. The rest of the power is stored on a battery. Thus, when the engine power is low, the hybrid drive system can assist the engine by using the electric power stored on the battery to drive the generator as an electric motor. This hybrid system always allows the engine to operate efficiently, thereby ensuring energy saving and reducing gas emission.

Thus, the application of such hybrid drive systems to hydraulic working machine such as hydraulic excavators is now being proposed, an example of which is a hybrid hydraulic working machine having an electric swing motor. The electric swing motor is advantageous for saving energy because the kinetic energy at the time of braking the electric motor can be regenerated as electric energy (note that in the case of a hydraulic swing motor, such kinetic energy is discharged as heat).

However, heat is generated from such electrical components as an electric swing motor, an electrical storage device for storing and discharging electric energy, and a power control unit (PCU) which is used to control the operation of the electric swing motor and the charging and discharging of the electrical storage device. For this reason, a hybrid hydraulic working machine is provided with a cooling system for cooling its electrical components. Such a cooling system includes a radiator for cooling a coolant and a pump for circulating the coolant, and the cooling system causes the pump to circulate the coolant cooled by the radiator, thereby cooling electrical components.

Widely used LLCs (long-life coolants) tend to increase in viscosity when temperature is low. Such an increased viscosity of a coolant increases line resistance of a cooling circuit. This increases pump loads, resulting in a decrease in energy efficiency. This issue is common to cooling systems used for hybrid automobiles.

The cooling system of Patent Document 1 below is proposed to overcome this issue. This conventional cooling system for an electric automobile aims to achieve stable cooling irrespective of the season and comprises a cooling circuit including a radiator and a pump; multiple switch valves; and a heating circuit including a heater. The cooling system controls the opening and closing of the switch valves based on ambient temperature. Specifically, when ambient temperature is low, those switch valves that have been used to form the cooling circuit at normal temperature are closed, and the other switch valves that have been left closed at that normal temperature are opened to form the heating circuit. The heater (an external heat source) is used to heat a coolant, and the heated coolant is circulated through the heating circuit. With this configuration, the conventional cooling system prevents a decrease in energy efficiency, which is attributable to the coolant viscosity increased at low temperature.

PRIOR ART DOCUMENT

Patent Document

Patent Document 1: Japanese Patent No. 3497873

SUMMARY OF THE INVENTION

Problems to be Solved by the Invention

The conventional cooling system of Patent Document 1, however, has the following problems. It has a cooling circuit as the basic structure, but also needs to have as the prerequisite structures a heater, multiple switch valves, and control means for controlling these. Thus, the cooling system is structurally complex. Such a complex structure could lead to manufacturing cost increases and breakdowns. Besides, the heater is an external heat source, which is not desirable in terms of energy efficiency.

An object of the present invention is thus to provide a cooling system for a hybrid working machine, which is capable of preventing decreases in energy efficiency at low temperature and is a simple structure.

Means for Solving the Problems (1) The present invention is a cooling system to be mounted on a hybrid working machine, the working machine comprising: an engine; a hydraulic pump driven by the engine; hydraulic actuators driven by a hydraulic fluid discharged from the hydraulic pump; a first electric motor driven by the engine; an electrical storage device for storing the electric power generated by the first electric motor and a second electric motor; the second electric motor driven by the electric power generated by the first electric motor and by the electric power stored on the electrical storage device; and a power control unit (PCU) for controlling the operation of the first electric motor and the second electric motor as well as controlling the charging and discharging of the electrical storage device, the cooling system comprising: a radiator for cooling a coolant; and a pump for circulating the coolant, the cooling system being designed to cool each of electric components including the electrical storage device, the PCU, and the second electric motor by causing the pump to circulate the coolant cooled by the radiator, wherein the cooling system further comprises a liquid temperature detection sensor for detecting the liquid temperature of the coolant, and the PCU has a heating mode functionality that helps any of the electric components to generate heat when the PCU is in a low-temperature mode in which the detected liquid temperature is less than a first threshold.

In the above cooling system, the heating mode functionality helps the electrical components to generate heat during the low-temperature mode. As a result, the liquid temperature of the coolant is increased, and its viscosity is reduced accordingly. The heating mode functionality, a distinctive feature of the invention, is one of the functions of the PCU. The heating mode functionality allows the PCU to be composed of a simple cooling circuit, also making it possible to prevent decreases in energy efficiency attributable to the coolant viscosity increased at low temperature.

(2) In the above (1), it is preferred that the PCU controls the electric charging and discharging of the electrical storage device based on the liquid temperature detected by the liquid temperature detection sensor, and the heating mode functionality is activated during the low-temperature mode.

(3) In the above (1), the PCU sets an optimal ratio of energy recovery between the electrical storage device and the first electric motor when the PCU is in a normal mode in which the detected coolant temperature is less than a second threshold that is equal to or greater than the first threshold, and the heating mode functionality sets the ratio of energy recovered by the electrical storage device during the low-temperature mode to be equal to or greater than the largest value of the energy recovery ratios of the electrical storage device in the normal mode.

With the above, the heating mode functionality is activated during the low-temperature mode, thereby helping the electrical storage device generate heat.

(4) In the above (1), it is preferred that the hybrid working machine further includes inactive-state detecting means for detecting an inactive state of the working machine, and the heating mode functionality exercises control such that electric charging and discharging are performed in a repeated manner between the electrical storage device and the first electric motor when the inactive-state detecting means has judged the working machine to be in an inactive state during the low-temperature mode.

With the above, the heating mode functionality is activated during the low-temperature mode, thereby helping the electrical storage device generate heat.

(5) In the above (1), it is preferred that the hybrid working machine further includes a braking device for controlling the operation of the second electric motor, and the heating mode functionality performs powering control to drive the second electric motor when the braking device stops the operation of the second electric motor during the low-temperature mode.

This allows the heating mode functionality to be activated at low temperature, thereby helping the second electric motor generate heat.

(6) In the above (1), the revolving speed of the pump is reduced while the heating mode functionality is being activated.

This allows the liquid temperature of the coolant to increase further.

(7) In the above (1), the hybrid working machine further includes a display device, and the display device indicates that the heating mode functionality is being activated when it is This attracts the attention of the operator.

Effect of the Invention

Present invention provides a cooling system to be mounted on a hybrid working machine, which is capable of preventing decreases in energy efficiency at low temperature and is a simple structure.

MODE FOR CARRYING OUT THE INVENTION

<Embodiment1>

Embodiment 1 of the present invention will now be described with reference to the accompanying drawings.

—Structure—

Figure 1:
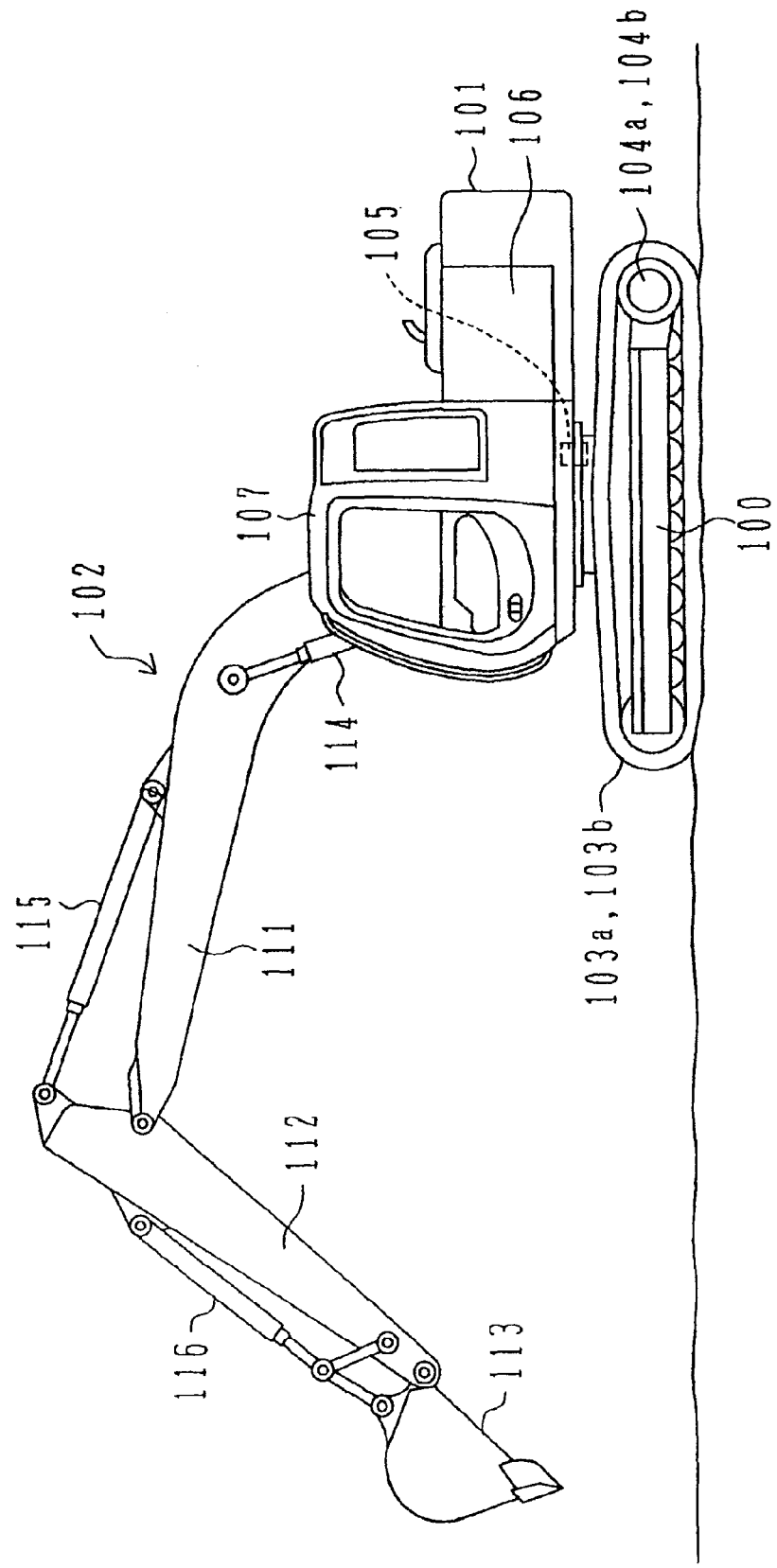
FIG. 1 is an external view illustrating a hydraulic excavator on which a cooling system is mounted.

FIG. 1 is an external view illustrating a hydraulic excavator on which a cooling system according to the present embodiment is mounted. The excavator includes a lower track structure 100, an upper swing structure 101, and a front device 102. The lower track structure 100 includes right and left crawler type travel devices 103a and 103b, which are driven by right and left travel motors 104a and 104b, respectively. The upper swing structure 101 is swingably mounted atop the lower track structure 100 via a swing motor 105. The front device 102 is attached to the front portion of the upper swing structure 101 in a vertically movable manner. The upper swing structure 101 includes an engine room 106 and a cab 107, and an engine 11 is placed inside the engine room 106. The front device 102 is a multi-joint structure including a boom 111, an arm 112, and a bucket 113. The boom 111, the arm 112, and the bucket 113 are turned by the expansion and contraction of a boom cylinder 114, an arm cylinder 115, and a bucket cylinder 116, respectively.

The swing motor 105 comprises a hydraulic swing motor 16 (see FIG. 2) and an electric swing motor 24 (see FIG. 2), meaning the hydraulic excavator of the present embodiment is a hybrid one. Note that each of the travel motors 104a and 104b may also comprise a hydraulic travel motor and an electric travel motor.

Figure 2:
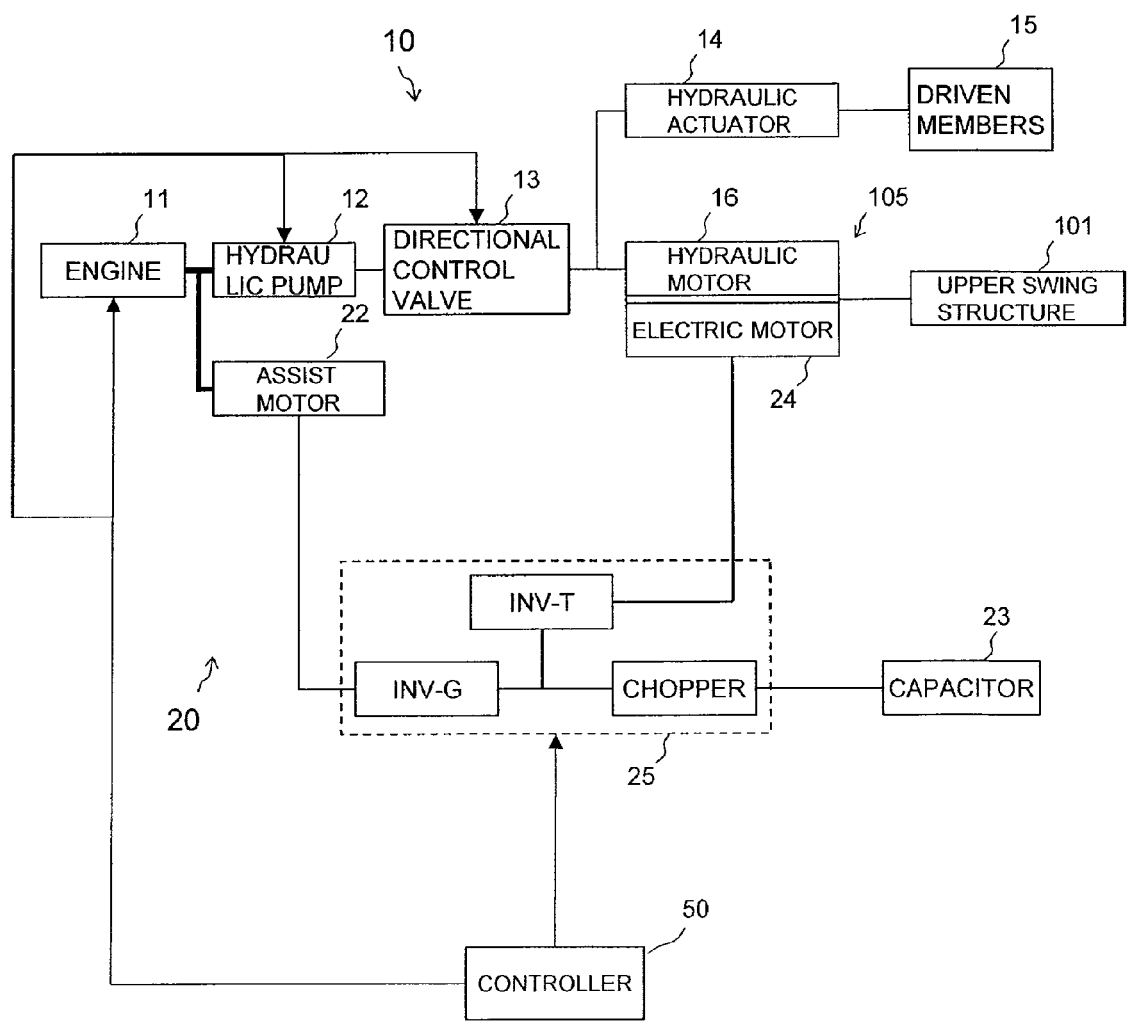
FIG. 2 is an explanatory diagram showing the drive system of a hybrid hydraulic excavator.

FIG. 2 is an explanatory diagram showing the drive system of the hybrid hydraulic excavator. The drive system comprises a hydraulic system 10 and an electric system 20.

The hydraulic system 10 includes the following components: the engine 11 (i.e., the prime mover); a hydraulic pump 12 driven by the engine 11; directional control valve unit 13 for controlling the direction and flow rate of the hydraulic fluid discharged from the hydraulic pump 12; hydraulic actuators 14 (e.g., the arm cylinder 115 and so on) driven by the fluid discharged from the hydraulic pump 12; driven components 15 (e.g., the arm 112 and so forth), which are driven by the actuators 14 to cause particular actions; and the hydraulic swing motor 16, driven by the fluid discharged from the hydraulic pump 12, for swinging the upper swing structure 101.

The electric system 20 includes the following components: the engine 11; a first electric motor 22 (assist motor) driven by the engine 11 to generate electric power; an electrical storage device 23 (capacitor) for storing the electric power generated by the assist motor 22; a second electric motor 24 (electric swing motor) driven by the power generated by the assist motor 22 and by the power stored on the electrical storage device 23; and a power control unit (PCU) 25 for controlling the operation of the assist motor 22 and the second electric motor 24 as well as controlling the charging and discharging of the capacitor 23.

The hydraulic swing motor 16 and the electric swing motor 24 shares a single rotary shaft and drive the upper swing structure 101 via a decelerating mechanism.

Because such electrical components as the capacitor 23, the electric swing motor 24, the PCU 25, and so forth inevitably generate heat, the hybrid hydraulic excavator includes a cooling system to cool such components.

A controller 50 is designed to control the following: the revolving speed and torque of the engine 11; the pressure and flow rate of the fluid discharged from the hydraulic pump 12; the displacement of the spools of the directional control valve unit 13; and the energy management and power flow control performed by the PCU 25 (described later).

Figure 3:
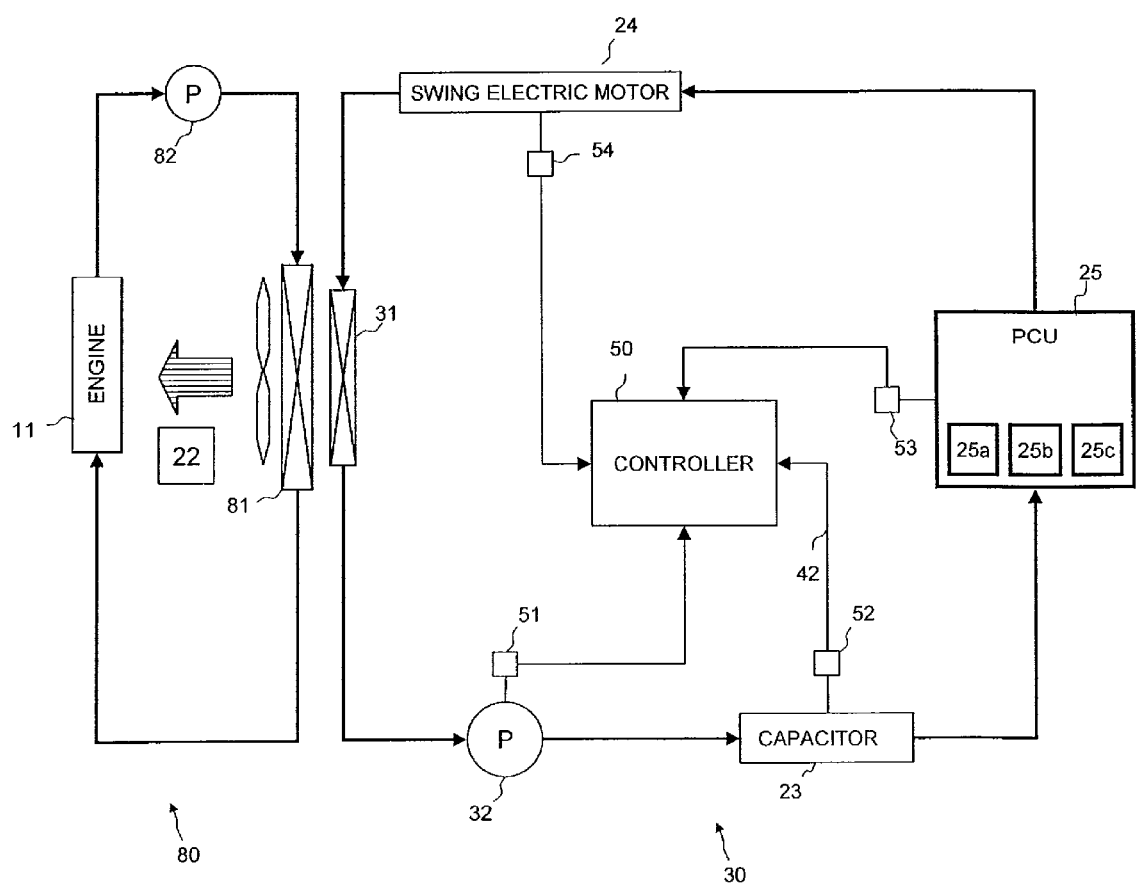
FIG. 3 is an explanatory diagram showing a cooling system according to Embodiment 1.

FIG. 3 is an explanatory diagram showing a cooling system according to the present embodiment. A cooling circuit 30 includes a radiator 31 for cooing a coolant and a pump 32 for circulating the coolant. Once the radiator 31 has cooled the coolant, the pump 32 circulates it, thereby cooling electrical components such as the capacitor 23, the electric swing motor 24, the controller 25, and so forth. The cooling circuit 30 is designed to cool the capacitor 23, the PCU 25, and the electric swing motor 24 in the stated order, and the pump 32 is placed downstream of the radiator 31.

A temperature detection sensor 51 is located downstream of the pump 32 and detects the liquid temperature T1 of the coolant circulated by the pump 32. A temperature detection sensor 52 is disposed on the capacitor 23 and detects the temperature T2 of the capacitor 23. A temperature detection sensor 53 is disposed on the PCU 25 and detects the temperature T3 of the PCU 25. A temperature detection sensor 54 is located on the electric swing motor 24 and detects the temperature T4 of the electric swing motor 24. The controller 50 receives detection signals from these temperature detection sensors 51 to 54.

In addition to the cooling circuit 30 that cools electrical components, the cooling system also includes an engine cooling circuit 80 for cooling the engine 11. This cooling circuit 80 includes a radiator 81 for cooling a coolant and a pump 82 for circulating the coolant. Note that the assist motor 22 is cooled by a cooling fan placed near the engine 11, which also cools the engine 11.

—Control—

Figure 4:
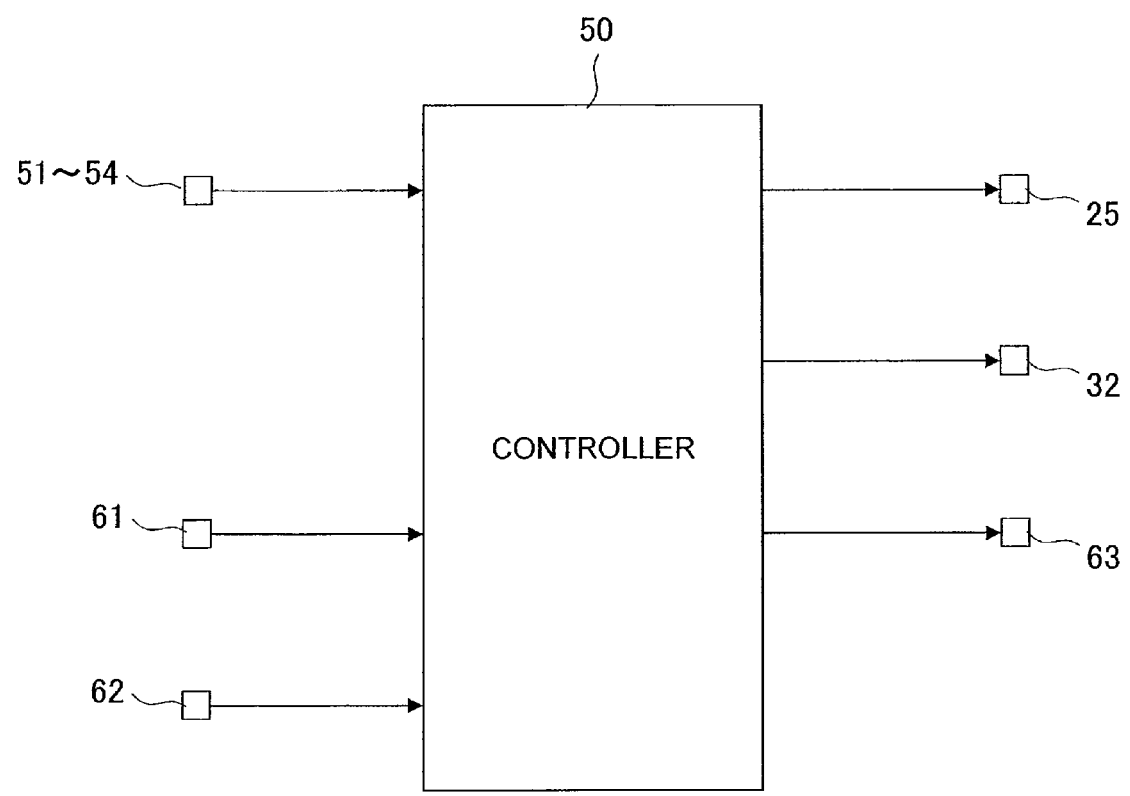
FIG. 4 is a diagram illustrating a controller in detail.

FIG. 4 is a diagram illustrating the controller 50 in detail. Note that the diagram illustrates only the distinctive inputs and outputs of the present embodiment, omitting typical inputs and outputs. The controller 50 receives detection signals from the temperature detection sensors 51 to 54 and command signals from a gate lock lever 61 (described later) and a control lever 62 (described later) and then performs predetermined calculations. After the calculation, the controller 50 transmits command signals to the PCU 25, the pump 32, and a monitor 63.

Figure 5:
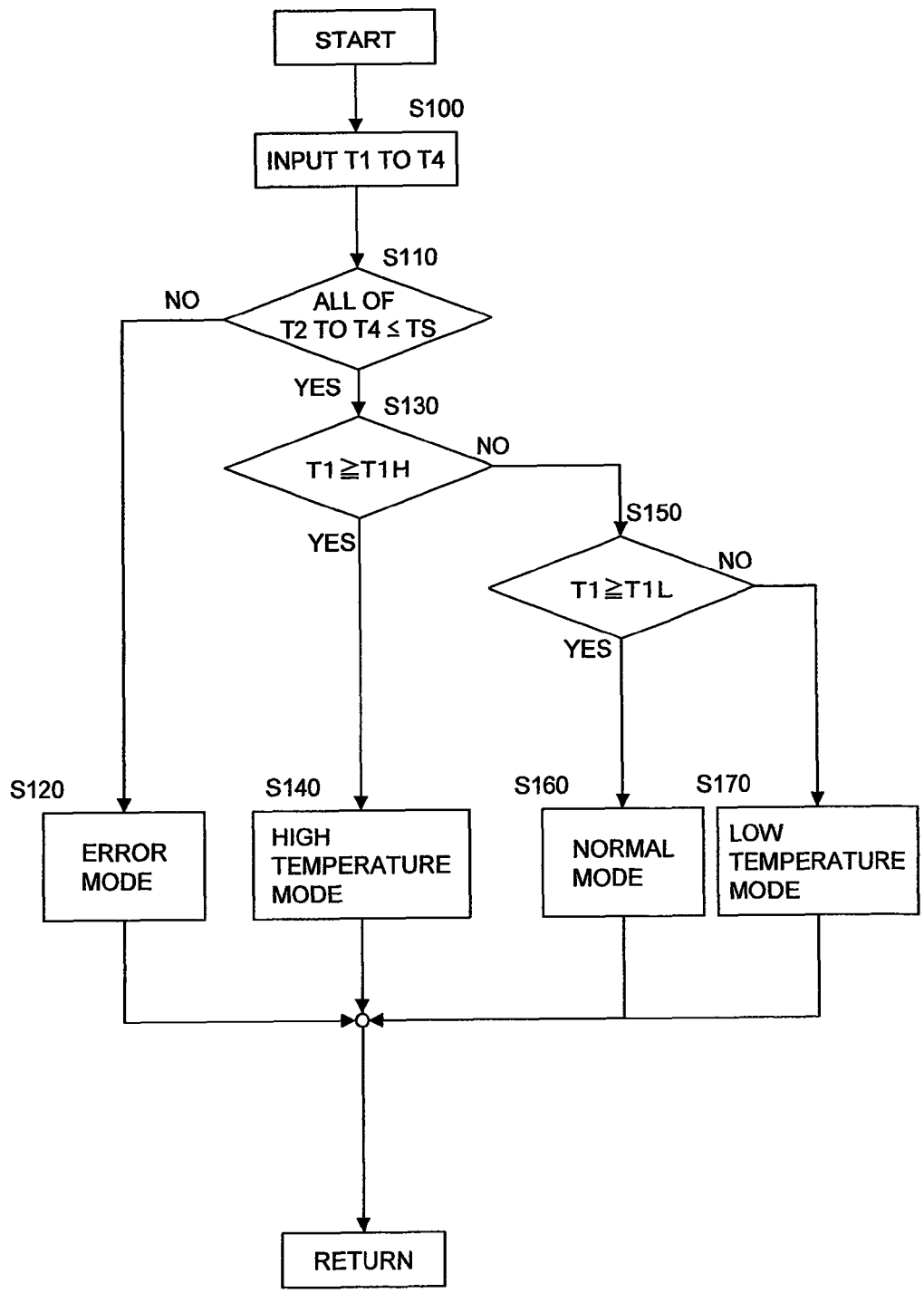
FIG. 5 is a flowchart illustrating the mode judgment process performed by the controller.

FIG. 5 is a flowchart illustrating the mode judgment process performed by the controller 50. All the temperatures T1 to T4 are input to the controller 50 from the temperature detection sensors 51 to 54 (Step S100). Then, the controller 50 judges whether or not the temperature T2 of the capacitor 23, the temperature T3 of the PCU 25, and the temperature T4 of the electric swing motor 24 are all equal to or less than a reference temperature Ts (Step S110). The reference temperature Ts is a threshold against which to judge whether these electric components are operating properly. It should be noted that for illustrative purposes, we have shown here the single reference temperature Ts, which is to be used for all those electric components. However, it is also possible to set different reference temperatures for the above electric components.

If, in Step S110, any of the temperatures T2 to T4 have been found greater than the reference temperature Ts (as indicated by NO), the controller 50 regards this as abnormalities of the internal temperatures of the electric components, followed by the selection of an error mode (Step S120).

When, on the other hand, all of the temperatures T2 to T4 have been found equal to or less than the reference temperature Ts (as indicated by YES), the controller 50 then judges whether or not the coolant temperature T1 is equal to or greater than a reference temperature T1H (Step S130). The reference temperature T1H (second threshold) is a threshold against which to judge whether or not a high-temperature mode is selected. When the temperature T1 has been found equal to or greater than the reference temperature T1H (as indicated by YES), the high-temperature mode is selected (Step S140).

When, in Step S130, the temperature T1 has been found less than the reference temperature T1H (as indicated by NO), the controller 50 then judges whether or not the coolant temperature T1 is equal to or greater than a reference temperature T1L (Step S150). The reference temperature T1L (first threshold) is a threshold against which to judge whether or not a low-temperature mode is selected. When the temperature T1 is equal to or greater than the reference temperature T1L (as indicated by YES), a normal mode is selected (Step S160). If not (as indicated by NO), the low-temperature mode is selected (Step S170).

Figure 6:
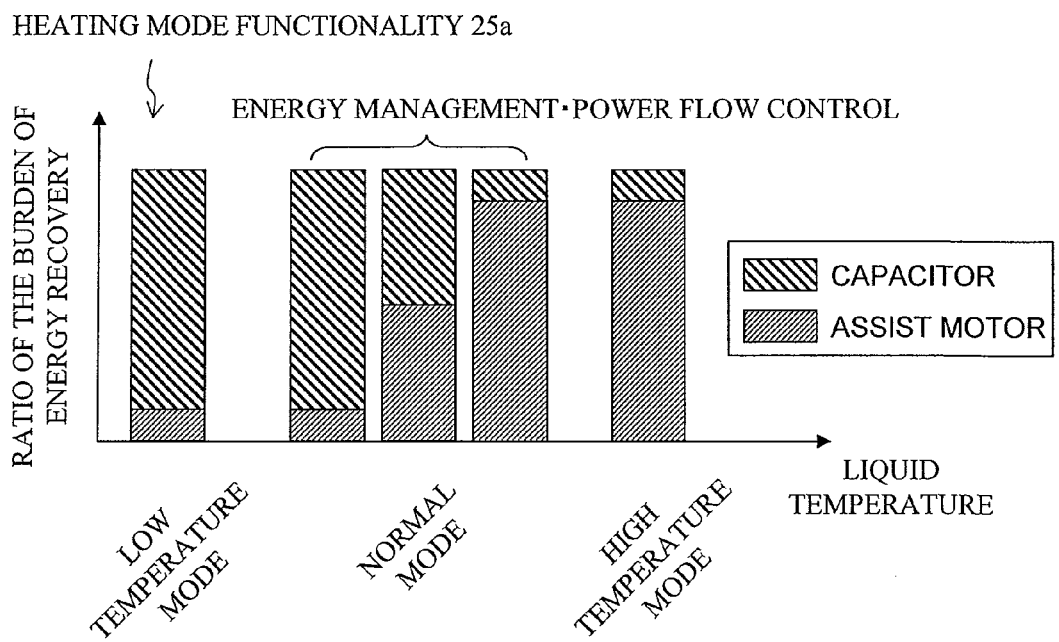
FIG. 6 is a conceptual diagram illustrating the energy management and power flow control performed by a PCU.

Next described is the control performed by the PCU 25. FIG. 6 is a graph illustrating the energy management and power flow control performed by the PCU 25.

One of the characteristics of a hybrid working machine is that the kinetic energy at the time of braking its electric swing motor can be regenerated as electric energy. Thus, during the normal mode (Step S160), the PCU 25 determines how much recovered energy should be used to drive the assist motor 22 so as to reduce the load on the engine 11 and how much of it should be stored on the capacitor 23. In other words, the PCU 25 sets the ratio of energy recovered between the assist motor 22 and the capacitor 23 based on the charged state of the capacitor 23, the amount of the energy recovered, temperature detection sensor information, engine load information, and the like, so that the most efficient charge/discharge control (energy management and power flow control) can be achieved in a sequential manner.

In the present embodiment, the PCU 25 further performs the following distinctive control operations.

During the high-temperature mode (Step S140), the ratio of energy recovered by the capacitor 23 is set to be equal to or less than the smallest value of the energy recover ratios of the capacitor 23 in the normal mode. This reduces the amount of energy stored on the capacitor 23, thus suppressing the amount of heat generated by the capacitor 23. As a result, the liquid temperature of the coolant can be prevented from increasing.

During the low-temperature mode (Step S170), the ratio of energy recovered by the capacitor 23 is set to be equal to or greater than the largest value of the energy recovery ratios of the capacitor 23 in the normal mode. This increases the amount of energy stored on the capacitor 23, thus increasing the amount of heat generated by the capacitor 23 as well. As a result, the liquid temperature of the coolant can be helped to increase (heating mode functionality 25a).

During the error mode (Step S120), the same operations as in the high-temperature mode (Step S140) are performed.

—Operation—

Next described is the operation of the cooling system of the present embodiment.

At the time of normal operation, the coolant is at normal temperature (i.e., equal to or greater than the reference temperature T1L (first threshold) and less than the reference temperature T1H (second threshold)), and the normal mode is selected (through S100, S110, S130, S150, and S160 in the stated order). Further, the PCU 25 sets the optimal ratio of energy recovery of the capacitor 23 and the assist motor 22. On the other hand, heat-generating electric components such as the capacitor 23, the electric swing motor 24, the PCU 25, and so forth need to be cooled to prevent malfunction. Thus, the cooling circuit 30 uses the pump 32 to circulate the coolant cooled by the radiator 31, thereby cooling the capacitor 23, the PCU 25, and the electric swing motor 24 in the stated order.

The cooling system of the present embodiment is especially useful when used in cold regions.

When ambient temperature is low, the liquid temperature of the coolant may also be low (i.e., less than the reference temperature T1L (first threshold)), resulting in an increase in the viscosity of the coolant. Consequently, a greater load is placed on the pumps, reducing energy efficiency. Therefore, at low temperature, the low-temperature mode is selected (through S100, S110, S130, S150, and S170 in the stated order), followed by the activation of the heating mode functionality 25a of the PCU 25. In other words, the PCU 25 sets the ratio of energy recovered by the capacitor 23 to be equal to or greater than the largest value of the energy recovery ratios of the capacitor 23 in the normal mode (e.g., assist motor 22:capacitor 23=2:8).

When the hydraulic excavator is in operation, the swing motor 105 (16, 24) causes the upper swing structure 101 to swing relative to the lower track structure 100, and the electric swing motor 24 recovers as electric energy the kinetic energy at the time of braking. With the above ratio, the PCU 25 uses 20% of the recovered energy to drive the assist motor 22 so as to reduce the load on the engine 11 and stores the rest (80%) on the capacitor 23. Thus, more energy is stored on the capacitor 23 than in the normal mode, helping the capacitor 23 generate heat. As a result, the liquid temperature of the coolant is increased, and its viscosity is reduced accordingly.

Moreover, the controller 50 excises control such that the revolving speed of the pump 32 is reduced while the heating mode functionality is being activated. This allows the coolant to receive more thermal energy per unit quantity from the heat generated by the capacitor 23. This further increases the liquid temperature of the coolant.

When the liquid temperature of the coolant has become equal to or greater than the reference temperature T1L, the normal mode is selected. The PCU 25 then terminates the heating mode functionality 25a and starts to perform normal energy management and power flow control. This helps prevent a decrease in energy efficiency, which may result from the coolant viscosity increased at low temperature.

The error mode (Step S120) and the high-temperature mode (Step S140) of the present embodiment are also effective.

While we have shown an example in which the cooling system is used in cold regions, but the heat generated by electric components increases the coolant temperature (e.g., up to the reference temperature T1H (second threshold) or greater); consequently, the electric components may not be cooled sufficiently. Thus, at high temperature, the present embodiment is designed to select the high-temperature mode (through S100, S110, S130, and S140 in the stated order), and the PCU 25 sets the ratio of energy recovered by the capacitor 23 to be equal to or less than the smallest value of the energy recovery ratios of the capacitor 23 in the normal mode (e.g., assist motor 22:capacitor 23=8:2). With this ratio, the PCU 25 uses 80% of the recovered energy to drive the assist motor 22 so as to reduce the load on the engine 11 and stores the rest (20%) on the capacitor 23. Thus, less energy is stored on the capacitor 23 than in the normal mode, suppressing the heat generated by the capacitor 23. As a result, the liquid temperature of the coolant is prevented from increasing.

It should be noted that the assist motor 22 has no influence on the cooling circuit 30 because the motor 22 is cooled by a fan, which is also used to cool the engine 11.

When the liquid temperature of the coolant has become less than the reference temperature T1H, the normal mode is selected. The PCU 25 then starts to perform normal energy management and power flow control. This helps the cooling circuit 30 cool electric components such as the capacitor 23, the PCU 25, and the electric swing motor 24. Also, reducing the load on the engine 11 by driving the assist motor 22 is desirable in terms of energy consumption.

When electric components generate excessive heat due to failure, the error mode is selected (through S100, S110, and S120 in the stated order). During the error mode, the PCU 25 performs the same control operations as in the high-temperature mode, and the controller 50 instructs the monitor 63 to indicate the cooling system is in the error mode.

—Effects—

The effects of the present embodiment are described below.

A conventional cooling system includes as the basic structure a cooling circuit and as additional structures multiple switch valves and a heating circuit including a heater. At low temperature, the switch valves are operated to form the heating circuit, and the heater (external heat source) is used to heat a coolant. This helps prevent a decrease in energy efficiency, which may result from the coolant viscosity increased at low temperature. Such a complex structure, however, may lead to manufacturing cost increases and breakdowns. Besides, the heater is an external heat source, which is not desirable in terms of energy efficiency.

The PCU 25 of the present embodiment, in contrast, has the heating mode functionality 25a (see FIG. 3) and is composed of a simpler basic structure (the cooling circuit 30 alone) so as to prevent a decrease in energy efficiency, which may result from the coolant viscosity increased at low temperature. Such a simpler structure not only prevents decreases in energy efficiency when ambient temperature is low, but also reduces manufacturing costs and enhances reliability. In addition, since the kinetic energy at the time of braking the electric swing motor 24 can be used as electric energy, an external heat source is not necessary, which is desirable in terms of energy consumption.

<Embodiment 2>

—Structure—

The drive system and cooling system of this embodiment, which are mounted on a hybrid hydraulic excavator, are the same as those of Embodiment 1 (see FIGS. 2 and 3) and thus will not be described again.

Figure 7:
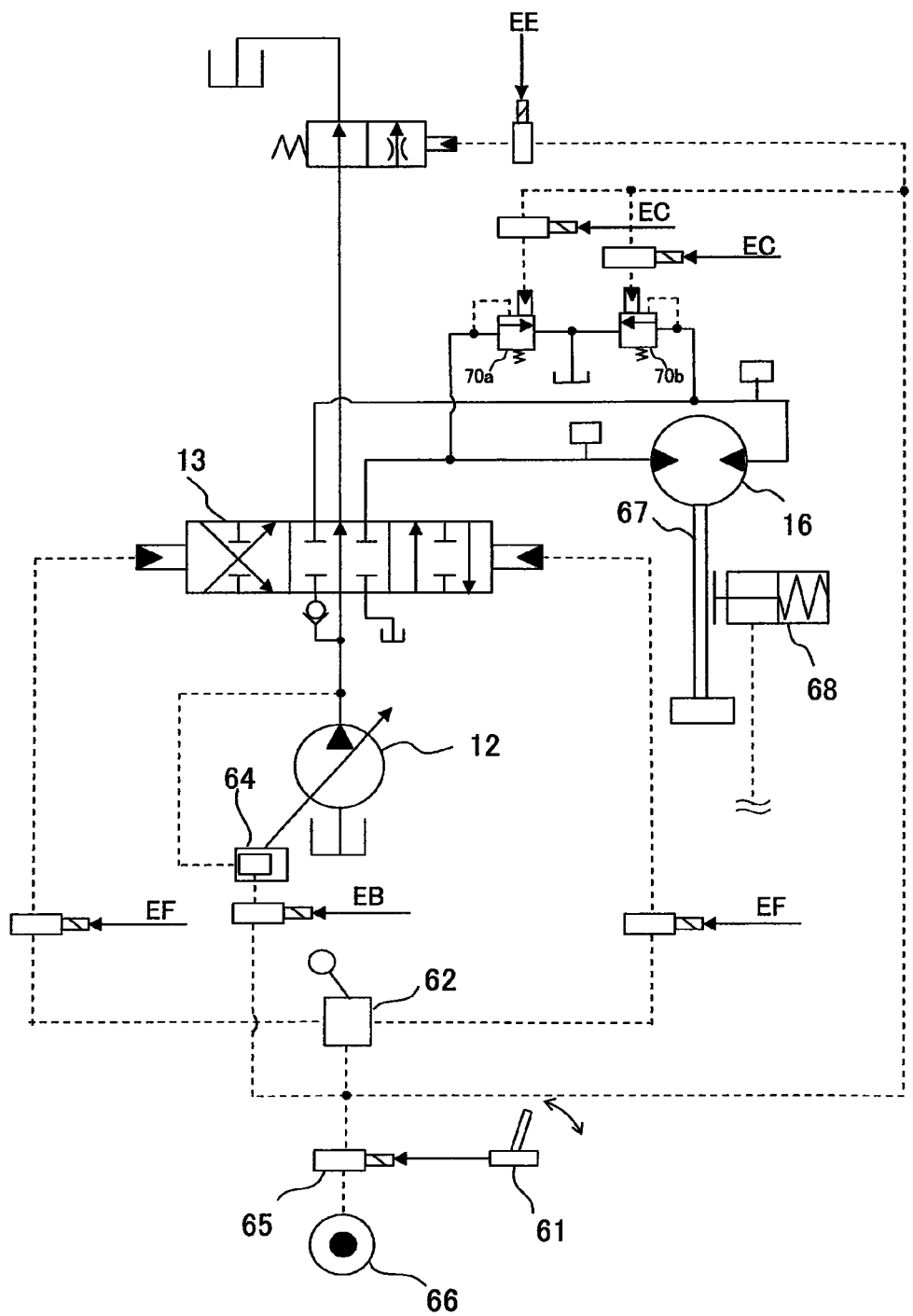
FIG. 7 is a diagram illustrating in detail the hydraulic system of the hybrid hydraulic excavator (particularly swing motion)

FIG. 7 is a diagram illustrating in detail the hydraulic system 10 of the hybrid hydraulic excavator (particularly swing motion). In FIG. 7, the same components as those used in FIG. 3 are assigned the same reference numerals. The hydraulic system 10 of Embodiment 2 is the same as that of Embodiment 1, but for the sake of convenience, we have not described its detailed structure in the section of Embodiment 1.

The directional control valve unit 13 includes multiple valves called spools, each used to operate a single actuator. A spool is displaced in response to a command from the control lever 62 (i.e., in response to a pilot operating pressure). As a result, the orifice area of that spool changes, and the flow rate of the hydraulic fluid passing through the associated hydraulic line also changes accordingly. Note that FIG. 7 illustrates only a swing spool 13.

The hydraulic pump 12 is of the variable displacement type and includes a regulator 64. Controlling the regulator 64 changes the tilt angle of the hydraulic pump 12, which changes the displacement volume of the hydraulic pump 12 accordingly. As a result, the output torque and discharge rate of the hydraulic pump 12 change as well.

During a hybrid (hydraulic/electric) swing mode in which the electric swing motor 24 and the hydraulic swing motor 16 are both operated to rotate the swing structure, the hydraulic system 10 controls variable relief valves 70a and 70b such that the output torque of the hydraulic swing motor 16 decreases by the amount of the working torque of the electric swing motor 24 of the electric system 20. As a result, the sum of the output torque of the electric swing motor 24 and the output torque of the hydraulic swing motor 16 will always stay substantially the same, ensuring favorable maneuverability. A detailed description of control methods and components related to the above is omitted here.

The control lever 62 houses a pressure reducing valve that reduces the pressure from a pilot pump 66 in response to how much the lever 62 is moved. The pressure reducing valve thus introduces a pilot operating pressure (i.e., the pressure corresponding to that manipulated amount) into either of the right and left pressure chambers of the swing spool 13.

The gate lock lever 61 is either in a lower position (unlock position) that does not allow the operator to get in/out of the cab or in an upper position (lock position) that allows the operator to do so. A pilot pressure shutoff value 65 is placed on the pilot line and is subjected to on/off control based on the upper or lower position of the gate lock lever 61. The pilot pressure shutoff valve 65 is capable of blocking a first pilot pressure or generating a pilot operating pressure.

—Control—

After receiving a signal indicating the gate lock lever 61 has been placed in the upper position (lock position), the controller 50 of the present embodiment judges the hydraulic excavator to be in an inactive state. The controller 50 also judges so when it has not received any command signal from the control lever 62 for a given amount of time (see FIG. 4). Accordingly, the gate lock lever 61, the control lever 62, and the controller 50 constitute inactive-state detecting means.

A mode judgment process performed by the controller 50 is the same as in Embodiment 1 (see FIG. 5) and will not be described again.

During the normal mode (Step S160), the PCU 25 performs energy management and power flow control (see FIG. 6).

One of the characteristics of present Embodiment is that when the controller 50 judges the excavator to be in an inactive state during the low-temperature mode (Step S170), the PCU 25 exercises control such that electrical charging and discharging are performed in a repeated manner between the capacitor 23 and the assist motor 22. This increases the energy stored on and discharged from the capacitor 23, helping the capacitor 23 generate heat. As a result, the liquid temperature of the coolant can be increased (heating mode functionality 25b; see FIG. 2 and additionally written to FIG. 3).

Operation and Effects

Embodiment 2 is especially useful during a warm-up of the hydraulic excavator.

Right after the start-up of the hydraulic excavator, it will not be warmed sufficiently, and the coolant may be at low temperature (e.g., less than the reference temperature T1L (first threshold)). The coolant may also be at low temperature when the idle time of the excavator becomes long.

Thus, the hydraulic excavator is warmed up at the time of start-up and during idle time. During the warm-up, the operator places the gate lock lever 61 in the upper position (lock position) for safety purposes. Also, the operator will not manipulate the control lever 62 for a while. Thus, the controller 50 detects these states to judge the excavator to be in an inactive state.

When the coolant temperature is low, the low-temperature mode is selected (S170). After the controller 50 has detected an inactive state of the excavator, the heating mode functionality 25b of the PCU 25 is activated as one of the warm-up operations.

At this time, the PCU 25 exercises control such that electrical charging and discharging are performed in a repeated manner between the capacitor 23 and the assist motor 22. This increases the energy stored on and discharged from the capacitor 23, helping the capacitor 23 generate heat. As a result, the liquid temperature of the coolant is increased, resulting in a decrease in its viscosity. Moreover, while the heating mode functionality is being activated, the controller 50 exercises control such that the revolving speed of the pump 32 is reduced for the purpose of further increasing the coolant temperature.

While the heating mode functionality 25b is being activated, the controller 50 can instruct the monitor 63 to indicate the hydraulic excavator is being warmed, thereby attracting the attention of the operator.

When the liquid temperature of the coolant has become equal to or greater than the reference temperature T1L, the normal mode is selected, followed by the termination of the heating mode functionality 25b of the PCU 25.

Similar to Embodiment 1, the PCU 25 of present Embodiment has the heating mode functionality 25b and is composed of a simple basic structure so as to prevent a decrease in energy efficiency, which is attributable to the coolant viscosity increased at low temperature. Thus, present Embodiment offers the same advantages as those of Embodiment 1.

<Embodiment 3>

—Structure—

Although it is not described for the sake of convenience, the hydraulic excavator also includes a swing parking brake 68 in Embodiments 1 and 2. The swing parking brake 78 is additionally written to FIG. 7.

The swing parking brake 68 includes a cylinder chamber, a braking component, and a spring. When hydraulic fluid is not present in the cylinder chamber, the biasing force of the spring causes the braking component to act on a rotary shaft 67 of the hydraulic swing motor 16, meaning the brake 68 is activated. When hydraulic fluid is introduced into the cylinder chamber, the fluid pressure resists the biasing force of the spring to detach the braking component from the rotary shaft 67 of the hydraulic swing motor 16 and deactivate the brake 68.

The rotary shaft 67 is shared by the hydraulic swing motor 16 and the electric swing motor 24; thus, the swing parking brake 68 is capable of stopping both of the drive of the hydraulic swing motor 16 and the drive of the electric swing motor 24.

Hydraulic fluid is supplied from the pilot pump 66 into the cylinder chamber of the swing parking brake 68 in synchronization with the operation of the gate lock lever 61 and the control lever 62. More specifically, when the gate lock lever 61 is in the upper position (lock position), or when the control lever 62 is not being manipulated, the swing parking brake 68 acts on the hydraulic swing motor 16 and the electric swing motor 24, limiting their operation (brake operation). In contrast, when the gate lock lever 61 is in the lower position (unlock position) and when the control lever 62 is being manipulated, the swing parking brake 68 is deactivated.

—Control—

The controller 50 receives command signals from the gate lock lever 61 and the control lever 62 and determines whether the swing parking brake 68 is being activated or deactivated (see FIG. 4).

A mode judgment process performed by the controller 50 is the same as in Embodiment 1 (see FIG. 5) and will not be described again.

During the normal mode (Step S160), the PCU 25 performs energy management and power flow control (see FIG. 6).

One of the characteristics of present Embodiment is that when the controller 50 judges the swing parking brake 68 to be in an activated state during the low-temperature mode (Step S170), the PCU 25 excises control so as to drive the electric swing motor 24. This helps the electric swing motor 24 generate heat, thereby increasing the liquid temperature of the coolant (heating mode functionality 25c; see FIG. 2 and additionally written to FIG. 3).

—Operation and Effects—

Similar to Embodiment 2, the present embodiment is especially useful during a warm-up of the hydraulic excavator.

Right after the start-up of the hydraulic excavator, it will not be warmed sufficiently, and the liquid temperature of the coolant may be low (e.g., less than the reference temperature T1L (first threshold)). The liquid temperature of the coolant may also be low when the idle time of the excavator becomes long (e.g., between a task and another).

During a warm-up operation, the operator places the gate lock lever 61 in the upper position (lock position) for safety purposes and will not manipulate the control lever 62 for a while. Under these conditions, the swing parking brake 68 prevents the operation of the hydraulic swing motor 16 and the electric swing motor 24, and the controller 50 will soon detect the activation of the brake 68.

When the coolant temperature is low, the low-temperature mode is selected (S170). After the controller 50 has detected an active state of the brake 68, the heating mode functionality 25c of the PCU 25 is activated as one of the warm-up operations.

At this time, the PCU 25 performs power running control to drive the electric swing motor 24. The electric swing motor 24 will be kept inoperative because the swing parking brake 68 is acting on the electric swing motor 24. Even so, almost all the electric energy used to drive the electric swing motor 24 can be converted into thermal energy. This helps the electric swing motor 24 generate heat. As a result, the liquid temperature of the coolant is increased, resulting in a decrease in its viscosity. Moreover, while the heating mode functionality 25c is being activated, the controller 50 exercises control such that the revolving speed of the pump 32 is reduced for the purpose of further increasing the coolant temperature.

At this time, the controller 50 can instruct the monitor 63 to indicate the hydraulic excavator is being warmed, thereby attracting the attention of the operator.

When the liquid temperature of the coolant has become equal to or greater than the reference temperature T1L, the normal mode is selected, followed by the termination of the heating mode functionality 25c of the PCU 25.

Similar to Embodiment 1, the PCU 25 of present Embodiment has the heating mode functionality 25c and is composed of a simple basic structure so as to prevent a decrease in energy efficiency, which is attributable to the coolant viscosity increased at low temperature. Thus, present Embodiment offers the same advantages as those of Embodiment 1.

<Other Embodiments>

The present invention is not limited to the aforementioned embodiments, but allows various modifications without departing from the essence and technical ideas of the invention. The essence of the present invention lies in the PCU 25 having the heating mode functionalities 25a, 25b, and 25c. Below are other possible embodiments.

1. While each of the aforementioned embodiments includes one of the heating mode functionalities 25a, 25b, or 25c, it is instead possible for each embodiment to have two or all of them. Because the heating mode functionalities 25a, 25b, and 25c do not interfere with one another, having several of them will further increase the liquid temperature of the coolant.

Figure 8:
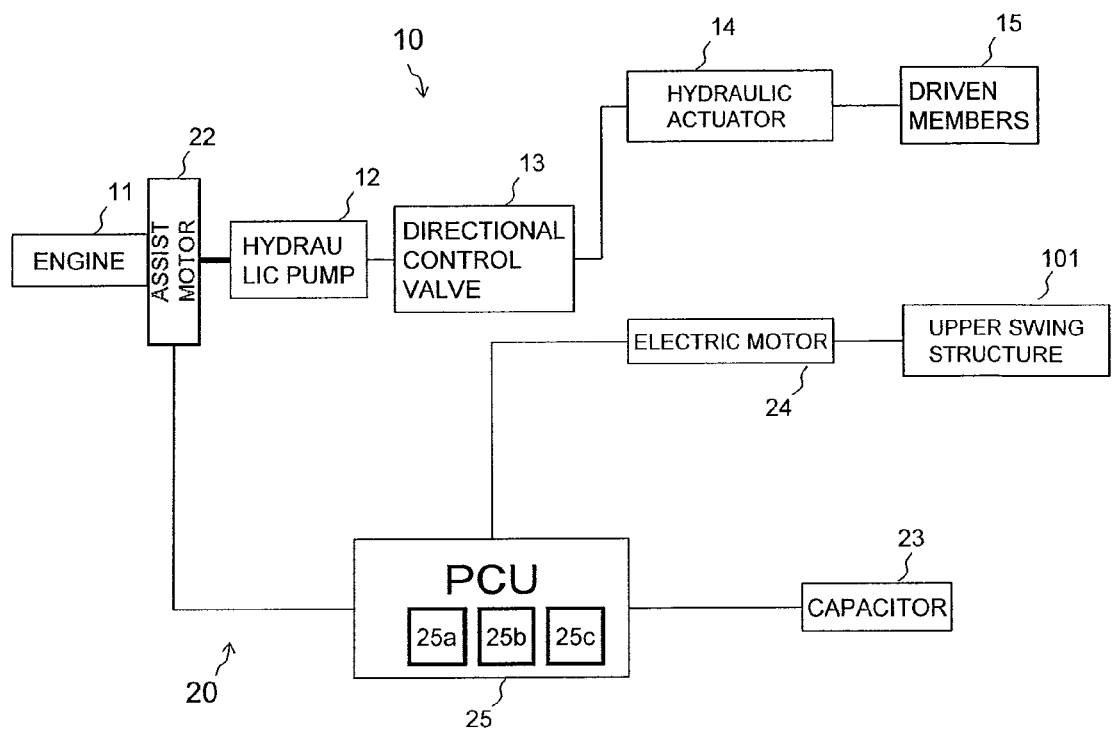
FIG. 8 is a diagram showing another drive system.

2. In the aforementioned embodiments, we have shown FIG. 2 as an example of the drive system of a hybrid hydraulic excavator, but the cooling system of the present invention can also be applied to a different drive system. FIG. 8 is a diagram illustrating another drive system. The assist motor 22 is fixed between the engine 11 and the hydraulic pump 12 and driven by an extra torque obtained when the engine 11 drives the hydraulic pump 12. The PCU 25 stores the electric energy generated by the assist motor 22 on the capacitor 23, and the swing motor 24 is driven by the electric power supplied from the capacitor 23. When the load on the engine increases, the PCU 25 receives electric power from the capacitor 23 to drive the assist motor 22 as an electric motor, thereby assisting the engine 11 to offset the torque shortage. The PCU 25 also determines whether the energy recovered at the time of braking the swing motor 24 should be used to drive the assist motor 22 so as to assist the engine 11 or stored on the capacitor 23.

The difference between the drive system of FIG. 2 and that of FIG. 8 is that while the former adopts a hybrid (hydraulic/electric) swing mechanism, the latter adopts an electric swing mechanism. Nevertheless, by the PCU 25 having the heating mode functionalities 25a, 25b, and 25c, the same advantages as those of the aforementioned embodiments can be achieved.

Description of Reference Numerals

10: Hydraulic system
11: Engine
12: Hydraulic pump
13: Directional control valve unit
14: Hydraulic actuators
15: Driven components
16: Hydraulic swing motor
20: Electric system
22: First electric motor (assist motor)
23: Electrical storage device (capacitor)
24: Second electric motor (electric swing motor)
25: PCU
25a, 25b, 25c: Heating mode functionality
30: Cooling circuit
31: Radiator
32: Pump
50: Controller
51 to 54: Temperature detection sensor
61: Gate lock lever
62: Control lever
63: Monitor
64: Regulator 65: Pilot pressure shutoff valve
66: Pilot pump
67: Rotary shaft
68: Swing parking brake
80: Engine cooling circuit
81: Radiator
82: Pump
100: Lower track structure
101: Upper swing structure
102: Front device
103a, 103b: Crawler type travel device
104a, 104b: Travel motor
105: Swing motor
106: Engine room
107: Cab
111: Boom
112: Arm
113: Bucket
114: Boom cylinder
115: Arm cylinder
116: Bucket cylinder

The invention claimed is:

1. A cooling system to be mounted on a hybrid working machine, the working machine comprising: an engine (11); a hydraulic pump (12) driven by the engine; hydraulic actuators (14) driven by a hydraulic fluid discharged from the hydraulic pump; a first electric motor (22) driven by the engine; an electrical storage device (23) for storing the electric power generated by the first electric motor and a second electric motor (24); the second electric motor driven by the electric power generated by the first electric motor and by the electric power stored on the electrical storage device; and a power control unit (PCU) (25) for controlling the operation of the first electric motor and the second electric motor as well as controlling the charging and discharging of the electrical storage device, the cooling system comprising: a radiator (31) for cooling a coolant; and a pump (32) for circulating the coolant, the cooling system being designed to cool each of electric components including the electrical storage device, the PCU, and the second electric motor by causing the pump to circulate the coolant cooled by the radiator, wherein the cooling system further comprises a liquid temperature detection sensor (51 to 54) for detecting the liquid temperature of the coolant, and the PCU has a heating mode functionality (25a, 25b, 25c) that helps any of the electric components to generate heat when the PCU is in a low-temperature mode in which the detected liquid temperature is less than a first threshold.

2. The cooling system for the hybrid working machine according to claim 1, wherein the PCU controls the electric charging and discharging of the electrical storage device based on the liquid temperature detected by the liquid temperature detection sensor, and the heating mode functionality is activated during the low-temperature mode.

3. The cooling system for the hybrid working machine according to claim 1, wherein the PCU sets an optimal ratio of energy recovery between the electrical storage device and the first electric motor when the PCU is in a normal mode in which the detected coolant temperature is less than a second threshold that is equal to or greater than the first threshold, and the heating mode functionality sets the ratio of energy recovered by the electrical storage device during the low-temperature mode to be equal to or greater than the largest value of the energy recovery ratios of the electrical storage device in the normal mode.

4. The cooling system for the hybrid working machine according to claim 1, wherein the hybrid working machine further includes inactive-state detecting means (50, 61, 62) for detecting an inactive state of the working machine, and the heating mode functionality exercises control such that electric charging and discharging are performed in a repeated manner between the electrical storage device and the first electric motor when the inactive-state detecting means has judged the working machine to be in an inactive state during the low-temperature mode.

5. The cooling system for the hybrid working machine according to claim 1, wherein the hybrid working machine further includes a braking device (68) for controlling the operation of the second electric motor, and the heating mode functionality performs powering control to drive the second electric motor when the braking device stops the operation of the second electric motor during the low-temperature mode.

6. The cooling system for the hybrid working machine according to claim 1, wherein the revolving speed of the pump is reduced while the heating mode functionality is being activated.

7. The cooling system for the hybrid working machine according to claim 1, wherein the hybrid working machine further includes a display device (63), and the display device indicates that the heating mode functionality is being activated when it is.

* * * * *